United States Patent
Drake et al.

(10) Patent No.: US 10,402,850 B2
(45) Date of Patent: Sep. 3, 2019

(54) RELIABILITY METRICS FOR REAL-TIME AUCTIONS

(71) Applicant: T-Mobile USA, Inc., Bellevue, WA (US)

(72) Inventors: Aaron Drake, Sammamish, WA (US); Jonathan Patrick Morrow, Issaquah, WA (US); Edissa Araceli Padilla-Lesko, Bainbridge Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 383 days.

(21) Appl. No.: 15/099,026

(22) Filed: Apr. 14, 2016

(65) Prior Publication Data
US 2017/0300958 A1 Oct. 19, 2017

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0261* (2013.01); *G06Q 30/0275* (2013.01)

(58) Field of Classification Search
CPC .......................................... G06Q 30/00–0284
USPC .............................................. 705/14.1–14.73
See application file for complete search history.

(56) References Cited

U.S. PATENT DOCUMENTS

| | | | |
|---|---|---|---|
| 2006/0149656 A1 | 7/2006 | Chefalas et al. | |
| 2008/0270209 A1 | 10/2008 | Mauseth et al. | |
| 2010/0306048 A1 | 12/2010 | Corduneanu et al. | |
| 2013/0332521 A1 | 12/2013 | Olague et al. | |
| 2015/0089568 A1* | 3/2015 | Sprague | H04L 63/0876 726/1 |
| 2017/0337589 A1* | 11/2017 | Yu | G06Q 30/02 |

FOREIGN PATENT DOCUMENTS

KR 20000072460 12/2000

OTHER PUBLICATIONS

PCT Search Report and Written Opinion dated Aug. 17, 2017 for PCT Application No. PCT/US17/25377, 13 pages.

* cited by examiner

*Primary Examiner* — John Van Bramer
(74) *Attorney, Agent, or Firm* — Lee & Hayes, P.C.

(57) ABSTRACT

A method includes receiving identification information with a first electronic device and via a network, wherein the identification information is unique to a particular user device accessing webpage content, determining whether the identification information matches an identifier of a plurality of identifiers stored in a memory associated with the first electronic device, generating a reliability metric based on the determining, and providing the reliability metric to a second electronic device different from the first electronic device via the network. In such methods, the reliability metric is accessible by at least one bidder during a real-time auction associated with the webpage content.

20 Claims, 4 Drawing Sheets

RELIABILITY METRICS FOR REAL-TIME AUCTIONS

BACKGROUND

Desktop computers, laptop computers, mobile telephones, tablets, and other electronic devices are commonly used to access webpage content generated by a variety of content publishers. Such content may include website pages that contain text, images, video, audio, and other items. Such webpage content may also include one or more advertisements positioned at various locations. In order to provide such advertisements as part of the webpage content, publishers typically submit an advertisement call to one or more advertisement exchanges positioned to facilitate real-time advertisement auctions for an available advertisement spot. In some examples, an exchange may facilitate a real-time auction among one or more advertisers (i.e., bidders) bidding on the available advertisement spot in response to the advertisement call. Such real-time auctions may last for milliseconds and, as a result, such auctions are often completed based on available data with varying degrees of accuracy and precision.

For example, publishers often include identification information with the advertisement call submitted to the advertisement exchange. Such identification information may include an advertisement ID or other similar identification code that is unique to a user receiving the content provided by the publisher. Such identification information may also include geographic information and/or other location identifiers indicative of a geographic location of the user device receiving the content sent by the publisher. Appending location information in the advertisement call increases relevance to consumers, which leads to improved advertisement performance and creates value to the publisher since advertisers are likely to place a higher bid, and ultimately pay a greater amount of money, for advertisement placements that include such information. For instance, such information, if accurate and precise, enables advertisers to target their advertisements to select audiences viewing the content and advertisement generated by the respective publishers. For this reason, such advertisers may be willing to pay a premium for advertisement placements based on such information.

Recently, however, it has become commonplace for some publishers to include inaccurate or invalid identification information in their respective advertisement calls. Since advertisers place advertisement space bids in a real-time advertisement auction without knowing whether the information provided by the publisher is accurate or precise, the advertisers risk overpaying the publisher for placement of their advertisement in the available advertisement space.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
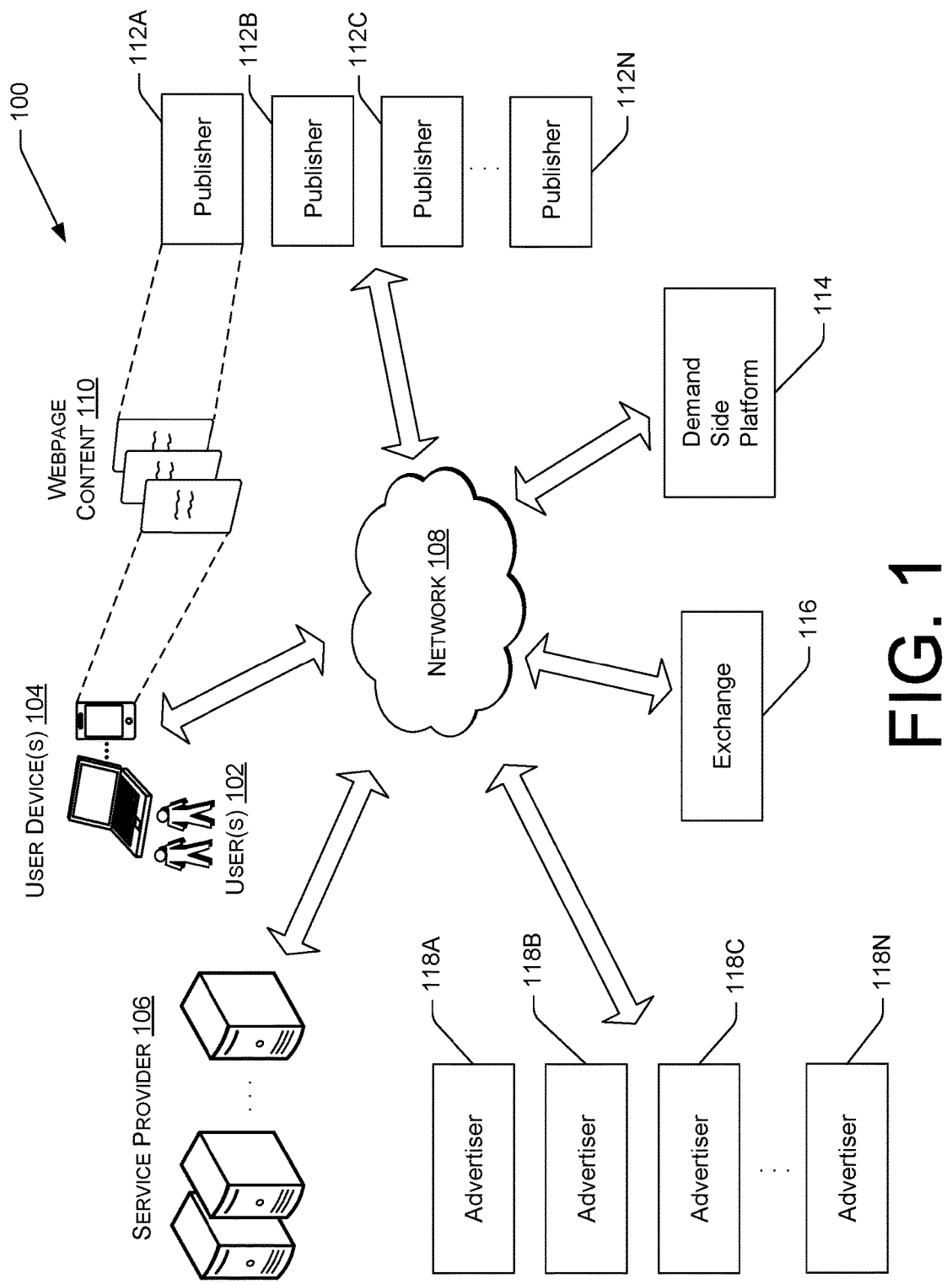
FIG. 1 illustrates an example architecture including example electronic devices in communication with an electronic device of a service provider via a network.

The present disclosure describes, among other things, methods and devices for generating a reliability metric that is specific to a particular publisher's monetized content and that is indicative of the validity of identification information provided by the publisher as part of an advertisement call. For example, such publishers may submit an advertisement call to an advertisement exchange, and the exchange may operate to facilitate a real-time auction between the publisher and one or more advertisers wishing to bid on the advertisement spot associated with the advertisement call. Such publishers may also submit identification information along with the advertisement call. As will be described in further detail below, in some examples such identification information may be an advertisement ID and/or any other identification code that, according to the publisher, is unique to a particular user device accessing webpage content generated by the publisher. Additionally or alternatively, such identification information may be a location identifier that, according to the publisher, is unique to the particular user device accessing the monetized content and is indicative of a geographic location of the user device.

Upon receiving such an advertisement call and the corresponding identification information, the exchange may transmit at least the identification information to a service provider configured to generate a reliability metric indicative of the validity of such information. For example, the service provider may capture and/or may have access to a plurality of identifiers associated with customers and/or subscribers of the service provider. For example, the service provider and/or one or more entities in communication with the service provider may maintain a database that includes telephone numbers, and associated advertisement IDs and/or other identification codes for each of its subscribers. The service provider and/or one or more entities in communication with the service provider may also maintain a database that includes telephone numbers and associated location envelopes for each of its subscribers. In such examples, such location envelopes may be unique to each user device of the respective subscriber, and may define a travel radius of the user device that is tracked by the service provider over time.

Upon receiving the identification information from the exchange, an electronic device of the service provider may determine whether the identification information matches any of the stored identifiers described above. For example, the service provider may determine whether the identification code provided by the publisher corresponds to any of the subscriber identification codes stored in one or more databases associated with service provider. Additionally or alternatively, the service provider may determine whether the location identifier provided by the publisher corresponds to and/or is within a stored location envelope corresponding to the particular user device accessing monetized content of the publisher.

Upon making such determinations, the service provider may generate a reliability metric that is unique to the publisher of the webpage content and that is indicative of the validity of the identification information appended to the advertisement call by the publisher. As will be explained in greater detail below, such a reliability metric may be generated in any number of ways. For example, the reliability metric may be a cumulative score that is indicative of the validity of the identification code, location identifier, and/or other identification information. Additionally, in some embodiments the cumulative reliability metric may be expressed as a percentage. For example, the service provider may generate a reliability metric on a scale of 0% to 100%, wherein a reliability metric of 100% indicates that identification information provided by a particular publisher has been found to be high quality and completely accurate over time. In such examples, cumulative reliability metrics that are expressed as percentages may be calculated according to a number and/or percentage of users that are determined to be subscribers of the service provider.

The service provider may also provide the reliability metric to the exchange such that the reliability metric may be accessible by one or more of the advertisers and/or other bidders participating in the real-time auction. Accordingly, any bids placed by such bidders during the auction may be made in view of the reliability metric. In such examples, the reliability metric may provide insight into the level of quality and accuracy of the data appended to the advertisement calls by the respective publishers, and may result in a fair price being paid by the advertisers for the advertisement placements being auctioned.

The techniques and systems described herein may be implemented in a number of ways. Example implementations are provided below with reference to the following figures.

Example Architecture

FIG. 1 illustrates an example architecture 100 in which one or more users 102 interact with a user device 104, such as a computing device that is configured to receive information from one or more input devices associated with the user device 104. For example, the user device 104 may comprise an electronic device and may be configured to accept information or other such inputs from one or more touch-sensitive keyboards, touchpads, touchscreens, physical keys or buttons, mice, styluses, or other input devices. In some examples, the user device 104 may be configured to perform an action in response to such input, such as outputting a desired letter, number, or symbol associated with a corresponding key of the touch-sensitive input device, selecting an interface element, moving a mouse pointer or cursor, scrolling on a page, accessing and/or scrolling content on a webpage, and so on. In some examples, the user devices 104 of the present disclosure may be configured to receive touch inputs via one or more touchpads, touchscreens, and/or other touch-sensitive input devices. Additionally, the user devices 104 of the present disclosure may be configured to receive non-touch inputs via one or more physical keys, buttons, mice, cameras, microphones, or other non-touch-sensitive input devices.

The user device 104 may represent any machine or other electronic device configured to execute and/or otherwise carry out a set of instructions. In some examples, such a user device 104 may comprise a stationary computing device or a mobile computing device. For example, a stationary computing device 104 may comprise, among other things, a desktop computer, a game console, a server computer, a plurality of linked servers, and the like. A mobile computing device 104 may comprise, among other things, a laptop computer, a smart phone, an electronic reader device, a mobile handset, a personal digital assistant (PDA), a portable navigation device, a portable gaming device, a tablet computer, a portable media player, a smart watch and/or other wearable computing device, and so on. The user device 104 may be equipped with one or more processors, computer readable media (CRM), input/output interfaces, input/output devices, communication interfaces, displays, sensors, and/or other components.

As shown in FIG. 1, a user device 104 may communicate with one or more devices, servers, service providers 106, or other components via one or more networks 108. The one or more networks 108 may include any one or combination of multiple different types of networks, such as cellular networks, wireless networks, Local Area Networks (LANs), Wide Area Networks (WANs), Personal Area Networks (PANs), and the Internet. Additionally, the service provider 106 may provide one or more services to the user device 104. The service provider 106 may include one or more computing devices, such as one or more desktop computers, laptop computers, server computers, and/or other electronic devices. In some examples, such service provider devices may include a keyboard or other input device, and such input devices may be similar to those described herein with respect to the user device 104. The one or more electronic devices of the service provider 106 may be configured in a cluster, data center, cloud computing environment, or a combination thereof. In one example, the one or more electronic devices of the service provider 106 may provide cloud computing resources, including computational resources, storage resources, and the like, that operate remotely to the user device 104. Example electronic devices of the service provider 106 may include, among other things, one or more processors, CRM, input/output interfaces, input/output devices, communication interfaces, and/or other components. In some examples, the one or more electronic devices of the service provider 106 may include one or more of the components described with respect to the user device 104. Accordingly, any description herein of components of the user device 104 may be equally applicable to the service provider 106. Additionally, any description herein of components of the electronic device of the service provider 106 may be equally applicable to the user device 104. Various example components of the electronic device of the service provider 106 will be described in greater detail with respect to FIG. 2.

In some examples, the user device 104 and/or the electronic device of the service provider 106 may access digital content via the network 108. For example, the user device 104 may access various websites via the network 108, and may, thus, access associated webpage content 110 shown on the website. Such webpage content 110 may be, for example, content that is available on respective webpages of the website. Such webpage content 110 may include, among other things, text, graphics, figures, numbers (such as serial numbers), characters, titles, snippets, URLs, charts, streaming audio or video, hyperlinks, executable files, media files, or other content capable of being accessed via, for example, the internet or other networks 108. In some examples, the webpage content 110 may comprise eBooks, magazine articles, newspaper articles, journal articles, white papers, social media posts, blog posts, PDFs, slideshows, manuals, or other forms of electronic documents or other content published online Such webpage content 110 may be accessed by the user device 104 via one or more internet browsers, search engines, applications, and/or other hardware or software associated with the user device 104. Additionally, such webpage content 110 may be accessed by the service provider 106 via one or more internet browsers, search engines, applications, and/or other hardware or software associated with the user device 104. For example, such webpage content 110 may be accessed using one or more news applications, blog applications, social media applications, email applications, search engines, and/or applications configured to provide access to a mixture of news, blogs, social media, search engines, and the like. In some examples, the webpage content 110 may include publicly available content that is freely accessible via the internet or other networks. In additional examples, the webpage content 110 may include privately available content that is accessible only to particular individual users 102 (e.g., users 102 that are employees of an organization, members of a club, etc.). In further examples, the webpage content 110 may include content that is accessible by subscription only (e.g., magazine subscription, newspaper subscription, search service subscription, etc.).

Any of the webpage content 110 described herein may be generated by one or more publishers 112A, 112B, 112C . . . 112N (collectively, "publishers 112") of the present disclosure. Such publishers 112 may be, for example, newspaper companies, magazine companies, blog companies, chat room companies, news outlets, and/or any other entity generating electronic content for consumption via the internet, and/or other such networks 108. As will be described in greater detail below, such publishers 112 often require advertisements to fill advertisement space at various locations within the webpage content 110. Accordingly, such publishers 112 may generate advertisement calls associated with such advertisement space and may submit such advertisement calls during a real-time advertisement auction via the network 108.

For example, such publishers 112 may submit various advertisement calls to at least one supply side platform (referred to herein as "SSP"). Such a SSP (not shown) may comprise a portal and/or broker connecting various publishers 112 with an exchange 116. In additional embodiments, publishers 112 of the present disclosure may submit advertisement calls to the exchange 116 directly, without the aid of the SSP. In any of the examples described herein, the exchange 116 may host and/or otherwise facilitate real-time bidding associated with the advertisement calls. In particular, the exchange 116 may provide an online and/or otherwise internet-based marketplace whereby one or more advertisers 118A, 118B, 118C . . . 118N (collectively, "advertisers 118") of the present disclosure may submit bids for the available advertisement space associated with such advertisement calls. In such examples, the various advertisers 118 described herein may comprise one or more retailers, manufacturers, service-based companies, and/or any other entities wishing to post an advertisement in the available advertisement space. In some examples, advertisers 118 of the present disclosure may submit bids for the advertisement space to at least one demand side platform (referred to herein as "DSP"). Such a DSP 114 may comprise a portal and/or broker connecting various advertisers 118 with the exchange 116. In additional embodiments, advertisers 118 of the present disclosure may submit bids to the exchange 116 directly, without the aid of the DSP 114. Additionally, in any examples of the present disclosure, the service provider 106 may provide reliability metrics and/or other information to the DSP 114 and/or to the advertisers 118 such that the advertisers 118 may place bids in view of such reliability metrics.

Is understood that while the publishers 112, SSP, DSP 114, exchange 116, and advertisers 118, are illustrated in schematic form in FIG. 1, such illustrations are not intended to limit the present disclosure in any way. For example, one or more of the schematic publishers 112, SSP, DSP 114, exchange 116, and advertisers 118 illustrated in FIG. 1 may include any of the server computers, laptop computers, desktop computers, tablets, mobile telephones, and/or other electronic devices described herein. In particular, one or more of the schematic publishers 112, SSP, DSP 114, exchange 116, and advertisers 118 illustrated in FIG. 1 may comprise an electronic device similar to and/or the same as the various electronic devices described herein with respect to the electronic device of the service provider 106 and/or the user device 104.

Example Electronic Device

Figure 2:
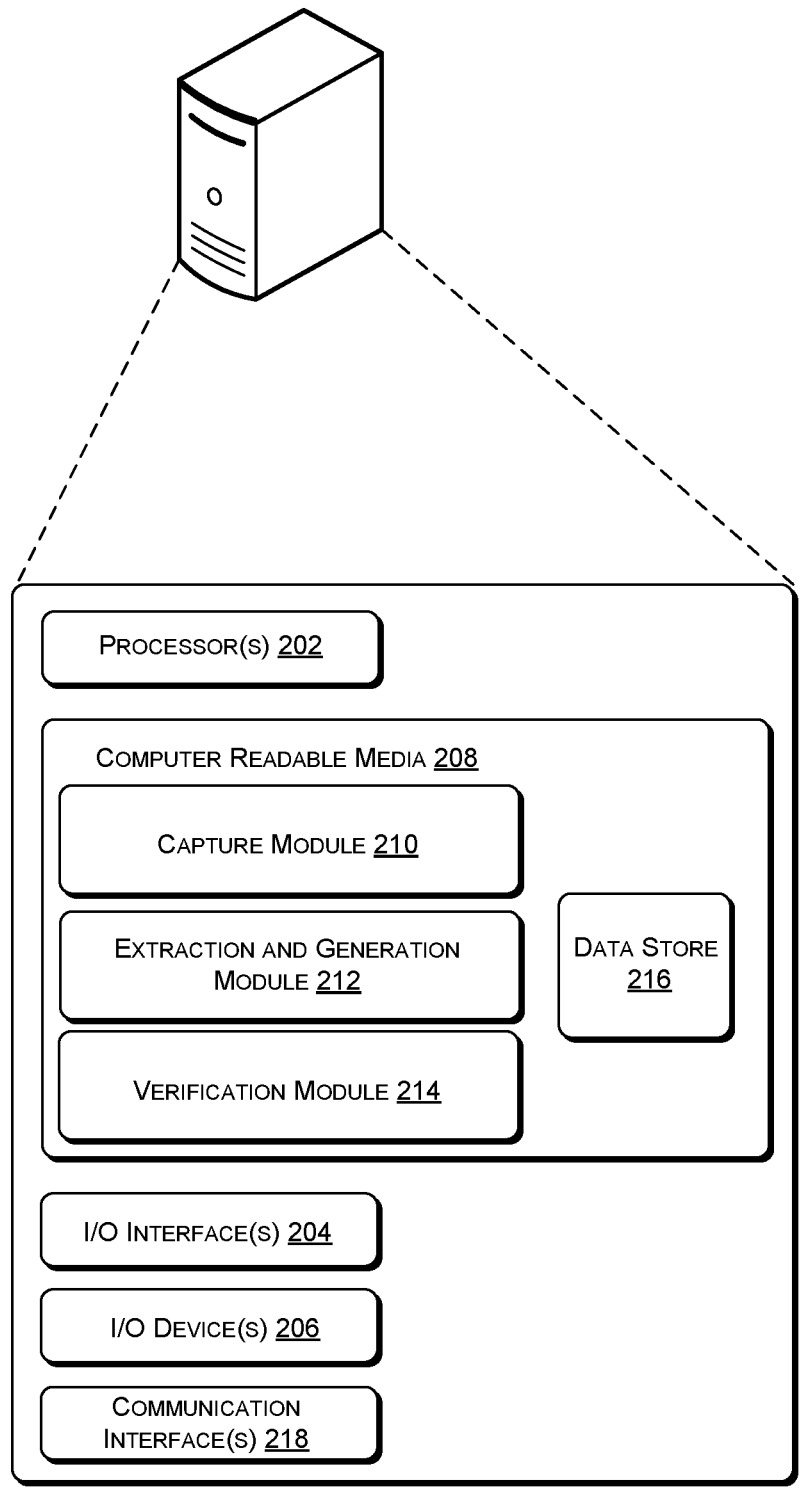
FIG. 2 illustrates example components of an electronic device.

FIG. 2 illustrates a schematic diagram showing example components included in the user device 104 and/or in the electronic devices of the service provider 106 of FIG. 1. For ease of description, an example electronic device of the service provider 106 will be described with respect to FIG. 2. As shown in FIG. 2, in some examples an electronic device of the service provider 106 may include one or more processors 202 configured to execute stored instructions. The electronic device of the service provider 106 may also include one or more input/output (I/O) interfaces 204 in communication with, operably connected to, and/or otherwise coupled to the one or more processors 202, such as by one or more buses.

In some examples, the one or more processors 202 may include one or more processing units. For instance, the processors 202 may comprise at least one of a hardware processing unit or a software processing unit. Thus, in some examples the processors 202 may comprise at least one of a hardware processor or a software processor, and may include one or more cores and/or other hardware or software components. For example, the one or more processors 202 may include a central processing unit (CPU), a graphics processing unit (GPU), a microprocessor, and so on. Alternatively, or in addition, the processor 202 may include one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The processor 202 may be in communication with, operably connected to, and/or otherwise coupled to memory and/or other components of the electronic device of the service provider 106 described herein. In some examples, the processor 202 may also include on-board memory configured to store information associated with various operations and/or functionality of the processor 202.

The I/O interfaces 204 may be configured to enable the electronic device of the service provider 106 to communicate with other devices, such as with the user devices 104 (FIG. 1). In some examples, the I/O interfaces 204 may comprise an inter-integrated circuit ("I2C"), a serial peripheral interface bus ("SPI"), a universal serial bus ("USB"), a RS-232, a media device interface, and so forth.

The I/O interfaces 204 may be in communication with, operably connected to, and/or otherwise coupled to one or more I/O devices 206. The I/O devices 206 may include one or more displays, cameras, controllers, microphones, touch sensors, and/or other sensors, a mouse, physical buttons, keys, a non-integrated keyboard, a joystick, a microphone, a speaker, a printer, and/or other devices. For example, one or more displays may be connected to the processors 202 and may be configured to render and/or otherwise display content thereon, including the webpage content described herein. In some examples, the display may comprise a touch screen display configured to receive touch input.

As shown in FIG. 2, the electronic device of the service provider 106 may also include CRM 208. The CRM 208 may provide storage of computer readable instructions, data structures, program modules and other data for the operation of the electronic device of the service provider 106. For example, the CRM 208 may store instructions that, when executed by the processor 202 and/or by one or more processors of, for example the electronic device of the service provider 106, cause the one or more processors to perform various acts. The CRM 208 may be in communication with, operably connected to, and/or otherwise coupled to the processors 202 and/or the other components described herein with respect to FIG. 2.

In some examples, the CRM 208 may include one or a combination of memory or CRM operably connected to the processor 202. Such memory or CRM may include computer storage media and/or communication media. Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The CRM 208 may store and/or otherwise include instructions that, when executed by the processor 202, cause the processor 202 to perform one or more operations of the present disclosure. For example, the CRM 208 may include software functionality configured as one or more modules. The term "module" is intended to represent example divisions of the software and/or hardware components of the CRM 208 for purposes of discussion, and is not intended to represent any type of requirement or required method, structure, manner, or organization. Accordingly, such modules, their functionality, and/or similar functionality could be arranged differently (e.g., combined into a fewer number of modules, broken into a larger number of modules, etc.). Further, while certain functions and modules may be implemented by software, hardware, and/or firmware executable by the processor 202, in other examples, one or more such modules may be implemented in whole or in part by other hardware components of the electronic device of the service provider 106 (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on.

In example embodiments, one or more modules of the CRM 208 may be configured to cause the processor 202 to capture identifiers and/or identification information from a plurality of user devices 104 receiving access to the network 108 via the electronic device of the service provider 106, associate such captured identifiers with telephone numbers of corresponding user devices 104, store such information in a data store of the CRM 208, receive identification information from additional electronic devices via the network 108, determine whether such identification information matches an identifier stored in the data store, generate a reliability metric indicative of whether such a match exists, provide the reliability metric to one or more electronic devices via the network 108, and/or any other operations or processes described herein.

For example, the CRM 208 may include at least one capture module 210, at least one extraction and generation module 212 (also referred to herein as the "extraction module 212"), and/or at least one verification module 214. The capture module 210 may include instructions that, when executed by the processor 202, cause the processor 202 to monitor usage and/or traffic across the network 108 by various users 102. For example, as the service provider 106 provides network access, internet access, and/or other services to users 102, the capture module 210 may cause the processor 202 to collect identifiers corresponding to and/or otherwise unique to each user device 104 connected to the network 108. In example embodiments, such identifiers may comprise, for example, latitude coordinates, longitude coordinates, and/or other geographic and/or location identifiers indicative of a geographic location of the user device 104. Additionally or alternatively, such identifiers may comprise, for example, an identification code, such as an advertisement ID, and/or any other code, data, information, or identification parameter that is unique to the user device 104.

It is understood that some of the user devices 104 connected to the network 108 may correspond to users 102 that are customers and/or subscribers of the service provider 106, while other user devices 104 connected to the network 108 may correspond to users 102 that are not customers or subscribers of the service provider 106. In such examples, the capture module 210 may cause the processor 202 to capture the identifiers unique to each user device 104, as well as the telephone number corresponding to the particular user device 104. The capture module 210 may also cause the processor 202 to store each of the captured identifiers in a data store 216 of the CRM 208 in association with the telephone number of the corresponding user device 104. Further, the data store 216 may include one or more lists or databases including the telephone number of each user device 104 of users 102 that are customers and/or subscribers of the service provider 106. Thus, the capture module 210 may also be configured to cause the processor 202 to determine whether a particular captured identifier corresponds to a known customer and/or subscriber of the service provider 106 by comparing, for example, a telephone number corresponding to the captured identifier to telephone numbers included in the one or more lists, or databases described above, and to determine whether a match exists. If a match does exist, the processor 202 may determine that the particular captured identifier does correspond to a known customer and/or subscriber of the service provider 106. Alternatively, if a match does not exist, the processor 202 may determine that the particular captured identifier does not correspond to a known customer/or subscriber of the service provider 106. In additional examples, such comparisons and/or determinations may be performed by the processor 202 using, for example, a captured identification code and/or advertisement ID.

In example embodiments in which the identifiers captured by the capture module 210 comprise geographic and/or location identifiers indicative of a geographic location of a particular user device 104, the capture module 210 may cause the processor 202 to store each of the captured identifiers in the data store 216 in association with and/or within a portion of the data store 216 corresponding to the particular user device 104. As with the captured identification codes described above, captured location identifiers may be associated and/or stored with corresponding telephone numbers of the particular user device 104. Over time, the combination of such geographic and/or location identifiers may comprise a location envelope of the particular user device 104. For example, such a location envelope may define a travel radius of the user device 104 based on a distance between a home location, or other central location or typical resting location of the user device 104 (e.g., a location at which the device is typically located between the hours of approximately 12:00 pm and approximately 6:00 am), and a most frequent furthest geographic location of the particular user device 104 from the home location captured by the processor 202. In some examples, such a location envelope may comprise a circular travel envelope having a center point at the above home location and a radius equal to the furthest distance described above. In other examples, such a location envelope may comprise any other shape determined by distances between the home location and respective geographic locations of the particular user device 104 captured by the processor 202 over time.

The extraction and generation module 212 may include instructions that, when executed by the processor 202, cause the processor 202 to receive, among other things, identification information via the network 108. In example embodiments, such identification information may be unique to a particular user device 104 accessing the network 108 and/or accessing webpage content 110. Some examples, the identification information received by the electronic device of the service provider 106 may include at least one of an identification code that is unique to a particular user device 104 accessing the webpage content, or a location identifier indicative of a geographic location of the particular user device 104. In any of the examples described herein, such identification information may be embedded within, appended to, encrypted, merged with, and/or otherwise combined with one or more electronic files received by the electronic device of the service provider 106 via the network 108. In such examples, upon receiving such electronic files the extraction and generation module 212 may remove, detach, decrypt, separate, and/or otherwise extract the identification information from the received electronic file. In some examples, such electronic files may comprise a request for a reliability metric received via the network 108 from the electronic device of the exchange 116, an electronic device of the SSP 114, and/or other electronic devices connected to the network 108. In some examples, the received request may identify a particular publisher 112, such as a publisher of webpage content 110 being accessed by a particular user device 104. Additionally, in some examples, the extraction and generation module 212 may cause the processor 202 to extract at least one of an identification code or a location identifier from the received electronic file.

Further, once the processor 202 has generated the requested reliability metric, the extraction and generation module 212 may cause the processor 202 to generate an additional electronic file that includes the reliability metric. For example, the extraction and generation module 212 may cause the processor 202 to generate an electronic file comprising a response to the received request, and to merge, add, append, and/or otherwise combined the reliability metric with such an electronic file. The electronic file generated by the processor 202 may be transferred to, for example, an electronic device of the exchange 116, an electronic device of the SSP 114, and/or one or more additional electronic devices connected to the network 108 by, for example, a communication interface 218 of the electronic device of the service provider 106. In such examples, the reliability metric included in the transferred electronic file may be accessible by at least one bidder during a real-time auction associated with the webpage content 110 described above, and/or hosted by an electronic device of the exchange 116.

The verification module 214 may include instructions that, when executed by the processor 202, cause the processor 202 to determine whether identification information received by the electronic device of the service provider 106 matches an identifier of a plurality of identifiers stored in the data store 216 and/or other portions or components of the CRM 208. As noted above, such identification information may include at least one of an identification code that is unique to a particular user device 104 accessing webpage content 110 generated by a corresponding publisher 112, or a location identifier indicative of a geographic location of the particular user device 104.

In examples in which the identification information includes such a particular identification code, the verification module 214 may cause the processor 202 to compare the particular identification code to the list of identification codes stored in the data store 216. Such identification codes stored in the data store 216 may comprise identification codes and/or other identifiers captured by the capture module 210 over time. In particular, the verification module 214 may cause the processor 202 to determine whether the particular identification code matches any of the identification codes stored in the data store 216. In examples in which the particular identification code does match one of the identification codes stored in the data store 216, the verification module 214 may cause the processor 202 to associate a first value with the publisher 112 corresponding to the accessed webpage content 110. If, however, the particular identification code does not match one of the identification codes stored data store 216, the verification module 214 may cause the processor 202 to associate a second value with the publisher 112 corresponding to the webpage content 110, less than the first value. For example, the verification module 214 may cause the processor 202 to associate a +1 (i.e., a first value) with a particular publisher 112 if such a match is found, and may cause the processor 202 to associate a −1 (i.e., a second value less than the first value) with the publisher 112 if such a match is not found. The verification module 214 may then cause the processor 202 to generate a reliability metric based on the first value or the second value. In some examples, such a reliability metric may comprise either the first value or the second value. Alternatively, in additional embodiments the reliability metric may be a cumulative score that is generated by the processor 202 based on the first value or the second value. For example, as multiple match determinations are made over time by the processor 202, each of the first and second values associated with the particular publisher 112 may be tabulated by the processor 202. Thus, in some examples, the reliability metric may be a cumulative sum of the first and second values determined by the processor 202 for the particular publisher 112. In still further examples, the reliability metric may comprise a percentage that is calculated based at least partly on such first and second values.

In examples in which the identification information includes a location identifier indicative of a geographic location of a corresponding user device 104 accessing webpage content 110 generated by a publisher 112, the verification module 214 may cause the processor 202 to compare the location identifier to a location envelope unique to the particular user device 104. As noted above, such a location envelope may define a travel radius of the user 102 to which the particular user device 104 corresponds, and may comprise a combination and/or collection of such location identifiers captured by the processor 202 over time and stored in the data store 216.

In particular, the verification module 214 may cause the processor 202 to determine whether the particular location identifier is within a location envelope of the corresponding user device 104 stored in the data store 216. In examples in which the particular location identifier is within such a corresponding location envelope, the verification module 214 may cause the processor 202 to associate a first value with the publisher 112 corresponding to the accessed webpage content 110. If, however, the particular location identifier is not within such a corresponding location envelope, the verification module 214 may cause the processor 202 to associate a second value with the publisher 112 corresponding to the webpage content 110, less than the first value. For example, the verification module 214 may cause the processor 202 to associate a +1 (i.e., a first value) with a particular publisher 112 if the particular location identifier is within such a corresponding location envelope, and may cause the processor 202 to associate a −1 (i.e., a second value less than the first value) with the publisher 112 if the particular location identifier is outside of such a corresponding location envelope.

As noted above, the verification module 214 may cause the processor 202 to generate a reliability metric based on the first value or the second value. In some examples, such a reliability metric may comprise either the first value or the second value. Alternatively, in additional embodiments the reliability metric may be a cumulative score that is generated by the processor 202 based on the first value or the second value. For example, as multiple comparisons between location identifiers provided by a publisher 112 and location envelopes corresponding to respective user devices 104 associated with such location identifiers are made over time by the processor 202, each of the first and second values associated with the particular publisher 112 may be tabulated by the processor 202. Thus, in some examples, the reliability metric may be a cumulative sum of the first and second values determined by the processor 202 for the particular publisher 112. In still further examples, the reliability metric may comprise a percentage that is calculated based at least partly on such first and second values. Additionally, while the first and second values described in the above examples have been described as +1, −1 respectively, in further examples, such first and second values may have any other value greater than or less than those noted above.

It is also understood that in any of the examples described herein, the reliability metrics generated by the processor 202 may be indicative of a trustworthiness, quality, accuracy, completeness, and/or validity of the identification information provided by a particular publisher 112, and such reliability metrics may be unique to the particular publisher 112. For example, in some embodiments the reliability metric generated by the processor 202 may be indicative of a validity of at least one of an identification code provided by a particular publisher 112 and unique to a user device 104, or a location identifier provided by the publisher 112 and indicative of a geographic location of the user device 104. In additional embodiments, the reliability metric generated by the processor 202 may be indicative of a validity of the identification code and a validity of the location identifier. For example, in such embodiments, the reliability metric may comprise respective cumulative scores indicative of the validity of the identification code the location identifier. Alternatively, the reliability metric may comprise a single consolidated score that is determined by the processor 202 based on such respective cumulative scores. In some examples, such a consolidated score may comprise a weighted average of a first score indicative of the validity of the identification code and of a second score, indicative of the validity of the location identifier. In still further examples, the reliability metric generated by the processor 202 may comprise any other output format useful in evaluating the trustworthiness, quality, accuracy, completeness, and/or validity of the identification information provided by a particular publisher 112.

In some examples, reliability metrics generated by the processor 202 may be stored in the data store 216. Additionally or alternatively, the communication interface 218 may be configured to transfer, transmit, and/or otherwise provide the reliability metric to one or more additional electronic devices via the network 108. By providing the reliability metric to such an additional electronic device via the network 108, the reliability metric may be accessible by at least one bidder during a real-time auction associated with the webpage content 110. In some examples, such a real-time auction may be hosted by an electronic device of the exchange 116, an electronic device of the SSP 114, and/any other electronic device connected to the network 108.

In example embodiments, the communication interface 218 may be configured to provide communications between the electronic device of the service provider 106 and other devices, such as between the electronic device of the service provider 106 and the electronic device of the exchange 116 via the network 108. Such communication interfaces 218 may be used to connect to one or more personal area networks ("PAN"), local area networks ("LAN"), wide area networks ("WAN"), wireless networks, telephone networks, internet networks, and so forth. For example, the communications interfaces 218 may include radio modules for a WiFi LAN and a Bluetooth PAN. The electronic device of the service provider 106 may also include one or more busses or other internal communications hardware or software that allow for the transfer of data between the various modules and components of the electronic device of the service provider 106.

While FIG. 2 illustrates various example components, the electronic device of the service provider 106 may have additional features or functionality. For example, the electronic device of the service provider 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the electronic device of the service provider 106 may reside remotely from the electronic device of the service provider 106 in some implementations. In these implementations, the electronic device of the service provider 106 may utilize the communication interfaces 218 to communicate with and utilize this functionality.

Example Process

Figure 3:
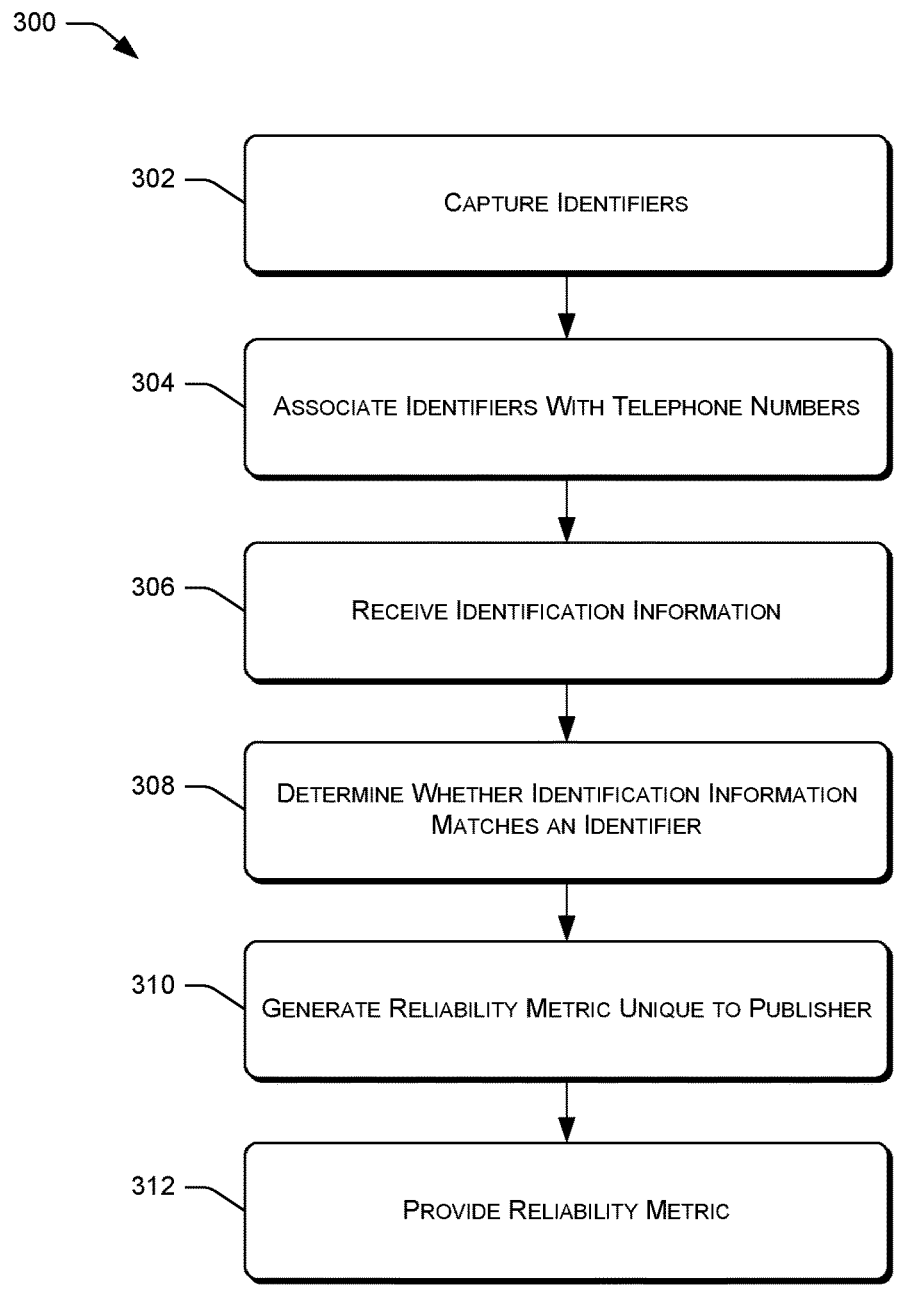
FIG. 3 shows a flow diagram illustrating an example method of generating a reliability metric unique to a particular publisher of webpage content.

FIG. 3 illustrates a process 300 as a collection of blocks in a logical flow diagram. The process 300 represents a sequence of operations that can be implemented in hardware, software, or a combination thereof. In the context of software, the blocks shown in FIG. 3 represent computer-executable instructions that, when executed by one or more processors, such as the processor 202, a processor of a user device 104, and/or a processor of one or more electronic devices of an advertiser 112, the SSP 114, the exchange 116, or an advertiser 118, cause the processor(s) to perform the recited operations. Generally, computer-executable instructions include routines, programs, objects, components, and/or data structures that perform particular functions or implement particular abstract data types. The order in which the operations are described is not intended to be construed as a limitation, and any number of the described blocks can be combined in any order and/or in parallel to implement the processes. For discussion purposes, the process 300 is described with reference to the architecture 100 of FIG. 1 and the components described with respect to FIG. 2. In some examples, each of the operations illustrated in FIG. 3 may be performed by an electronic device of the service provider 106 and/or components thereof. Additionally, in some examples one or more of the operations illustrated in FIG. 3 may be performed by a user device 104. For the duration of the disclosure, the process 300 will be described with respect to the electronic device of the service provider 106 unless otherwise noted.

Figure 4:
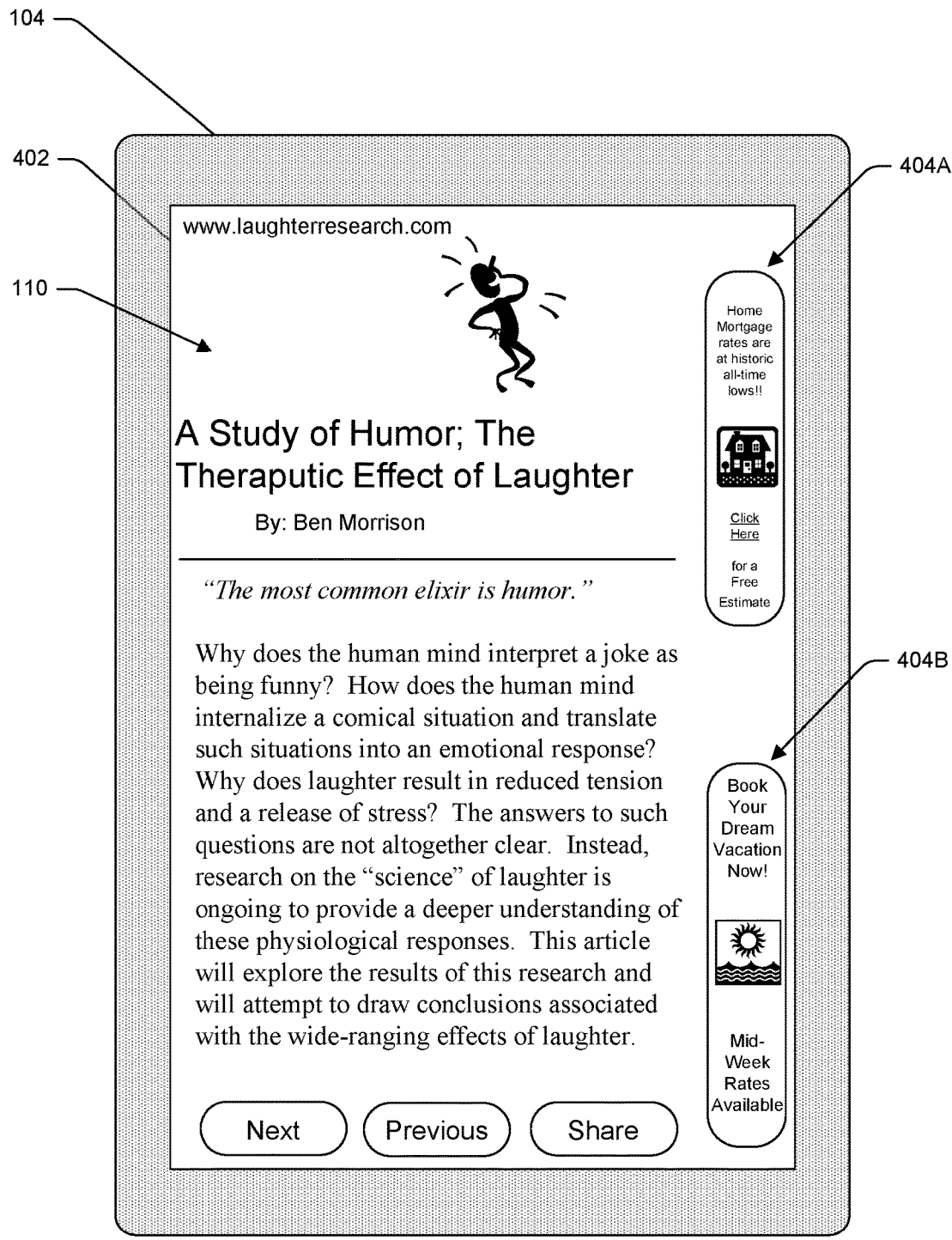
FIG. 4 illustrates example webpage content rendered on an electronic device.

In some examples, a user 102 may initiate one or more of the methods described herein by activating one or more applications on the user device 104. Such an application may, for example, enable the user to access and/or view webpage content 110 on the user device 104 and via the network 108. For example, as shown in FIG. 4, an example user device 104 may include a display 402, and the user 102 may view webpage content 110 generated by one or more of the publishers 112 via the display 402. Such applications may comprise one or more search engines, browsers, content viewers, news applications, blog applications, social media applications, and/or other applications operable on the user device 104. Such applications may be activated by, for example, directing one or more touch inputs to the user device 104 via the display 402. In other examples, such applications may be activated by directing one or more non-touch inputs to the user device 104, such as via one or more physical buttons or keys of the user device 104, a mouse connected to the user device 104, or other I/O devices associated with the user device 104.

As shown in FIG. 3, an example method of the present disclosure may include rendering various webpage content 110 on the display 402 of the user device 104, and such webpage content 110 may include one or more locations 404A, 404B (collectively referred to as "locations 404") that are typically filled by advertisements. While the remainder of the webpage content 110 rendered on the display 402 may be generated by a particular publisher 112, the advertisements rendered at the various locations 404 are generated by the advertisers 118 described with respect to FIG. 1.

In example embodiments, the electronic device of the service provider 106 may provide network access, internet access, and/or other services to one or more user devices 104, and at Step: 302 the service provider 106 may collect, record, and/or otherwise capture identifiers corresponding to and/or otherwise unique to user devices 104 connected to the network 108. As noted above, such identifiers may comprise, for example, latitude coordinates, longitude coordinates, and/or other geographic and/or location identifiers indicative of a geographic location of the user device 104. Additionally or alternatively, such identifiers may comprise, for example, an identification code, such as an advertisement ID and/or any other code, data, information, or identification parameter that is unique to the user device 104.

In such examples, the electronic device of the service provider 106 may capture the identifiers unique to each user device 104, as well as the telephone number corresponding to the particular user device 104. For example, at Step: 304, the electronic device of the service provider 106 may match, link, and/or otherwise associate each of the captured identifiers with the telephone number of the corresponding user device 104, and may store each of the captured identifiers in the data store 216 in association with the telephone number of the corresponding user device 104. Further, the data store 216 may include one or more lists or databases including the telephone number of each user device 104 of users 102 that are customers and/or subscribers of the service provider 106. Thus, in some embodiments, at Step: 304 the electronic device of the service provider 106 may determine whether a particular captured identifier corresponds to a known customer and/or subscriber of the service provider 106 by comparing, for example, a telephone number corresponding to the captured identifier to telephone numbers included in the one or more lists or databases described above, and may determine whether a match exists. If a match does exist, the electronic device of the service provider 106 may determine that the particular captured identifier does correspond to a known customer and/or subscriber of the service provider 106. Alternatively, if a match does not exist the electronic device of the service provider 106 may determine that the particular captured identifiers does not correspond to a known customer/or subscriber of the service provider 106.

In example embodiments in which the identifiers captured at Step: 302 comprise location identifiers, the electronic device of the service provider 106 may store each of the captured identifiers in the data store 216 in association with and/or within a portion of the data store 216 corresponding to the particular user device 104. As with the captured identification codes described above, at Step: 304 the electronic device of the service provider 106 may associate such captured location identifiers with corresponding telephone numbers of the particular user device 104.

At Step: 306, the electronic device of the service provider 106 may receive identification information from an electronic device of the exchange 116 via the network 108. In example embodiments, such identification information may be unique to a particular user device 104 accessing webpage content 110 generated by a particular publisher 112. Additionally, in example embodiments in which the received identification information comprises an identification code, such as an advertisement ID, such identification information may be provided to the publisher 112 of the webpage content 110 while the webpage content 110 is accessed on the user device 104. For example, such identification information may be generated by a third-party, such as a manufacturer of the user device 104 and/or a developer of an application running on the user device 104. In such examples, the user device 104 may provide the identification information to the electronic device of the publisher 112 via the network 108 either automatically or in response to a request by an electronic device of the publisher 112.

In any of the examples described herein, at Step: 306 the electronic device of the service provider 106 may receive a request for a reliability metric associated with the publisher 112 of the webpage content 110 being accessed by the particular user device 104. In such examples, such a request may be received from the electronic device of the exchange 116 in response to an advertisement call generated by the publisher 112. Additionally, such a request may include the identification information described above. In particular, such identification information may be provided by the publisher 112 as part of the advertisement call. In some examples, the identification information may be appended to the advertisement call by the publisher 112. The electronic device of the exchange 116 may provide such identification information to the electronic device of the service provider 106 with and/or as part of the request. In some examples, the electronic device of the publisher 112 may provide such identification information to an electronic device of the SSP, and the electronic device of the SSP may provide such identification to the electronic device of the exchange 116 as part of the request. Additionally, the electronic device of the exchange 116 may provide such identification information to an electronic device of the DSP 114, and the electronic device of the DSP 114 may provide such identification information to the electronic device of the service provider 106 as part of the request. In still further examples, at least one of the SSP and the DSP may be omitted. In some embodiments, the electronic device of the service provider 106 may generate a reliability metric indicative of the validity of such identification information based at least partly on such a request.

It is understood that in some examples, such identification information provided by the publisher 112 as part of the advertisement call may be inaccurate, erroneous, fraudulent, and/or otherwise invalid. In other examples, on the other hand, such identification information provided by the publisher 112 as part of the advertisement call may be accurate, correct, truthful, and/or otherwise valid. Accordingly, in any of the examples described herein one or more reliability metric generated by the electronic device of the service provider 106 may provide information relevant to the trustworthiness of the respective publishers 112 that may be accessed and/or used by advertisers 118 and/or other bidders participating real-time advertisement auctions associated with the webpage content 110.

At Step: 308, the electronic device of the service provider 106 may determine whether the identification information received at Step: 306 matches an identifier of a plurality of identifiers stored in the CRM 208. For example, in embodiments in which the identification information includes a particular identification code, the electronic device of the service provider 106 may, at Step: 308, compare the particular identification code to a list of identification codes stored in the data store 216. Such identification codes stored in the data store 216 may comprise identification codes and/or other identifiers captured at Step: 302 over time. In examples in which an identification code received at Step: 306 does match one of the identification codes stored in the data store 216, the electronic device of the service provider 106 may associate a first value with the publisher 112 corresponding to the accessed webpage content 110. If, however, the identification code received at Step: 306 does not match one of the identification codes stored data store 216, the electronic device of the service provider 106 may associate a second value with the publisher 112 corresponding to the webpage content 110, less than the first value.

In examples in which the identification information received at Step: 306 includes a location identifier indicative of a geographic location of a corresponding user device 104 accessing webpage content 110 generated by the publisher 112, the electronic device of the service provider 106 may, at Step: 308, compare the location identifier to a location envelope unique to the particular user device 104. As noted above, such a location envelope may define a travel radius of the user 102 to which the particular user device 104 corresponds, and may comprise a combination and/or collection of such location identifiers captured at Step: 302 over time and stored in the data store 216. In particular, at Step: 308 the electronic device of the service provider 106 may determine whether the particular location identifier is within a location envelope of the corresponding user device 104 stored in the data store 216. In examples in which the particular location identifier is within such a corresponding location envelope, the electronic device of the service provider 106 may associate a first value with the publisher 112 corresponding to the accessed webpage content 110. If, however, the particular location identifier is not within such a corresponding location envelope, the electronic device of the service provider 106 may associate a second value with the publisher 112 corresponding to the webpage content 110, less than the first value.

At Step: 310, the electronic device of the service provider 106 may generate a reliability metric based on the determination made at Step 308. In such examples, the reliability metric generated at Step: 310 may be unique to the particular publisher 112 generating the webpage content 110 being accessed by the user device 104. Additionally, in some examples the reliability metric generated at Step: 310 may comprise a cumulative score indicative of the validity of the identification information provided by the publisher 112, and/or received at Step: 306. In some examples, generating the reliability metric at Step: 310 may include one or more of the comparisons, first value determinations, second, value determinations, and/or other processes described above with respect to at least Step: 308. For example, generating the reliability metric at Step: 310 may include determining a cumulative score indicative of the validity of such received identification information based on one or more previous determinations as to whether additional identification information received by the electronic device of the service provider 106 matched respective identifiers of the plurality of identifiers captured at Step: 302 and stored in the CRM 208.

At Step: 312, the electronic device of the service provider 106 may provide the reliability metric generated at Step: 310 to the electronic device of the exchange 116, the electronic device of at least one advertiser 118, and/or to any other electronic devices connected to the network 108. For example, at Step: 312, the electronic device of the service provider 106 may transmit the reliability metric to an electronic device of the network 108 such that the reliability metric may be accessible by at least one of the advertisers 118 and/or other bidders during a real-time auction hosted by the electronic device of the exchange 116.

Examples of the present disclosure may provide participants in real-time advertising auctions associated with online content and/or other website content 110 with more information than is currently available in existing auctions. For example, the reliability metrics generated according to the embodiments described above may provide an indication of the validity of the advertisement IDs or other identification codes provided by publishers 112 as part of an advertisement call. Such reliability metrics may also provide an indication of the validity of a location identifier provided by publishers 112 as part of an advertisement call. As a result, such reliability metrics may be indicative of how trustworthy or untrustworthy a particular publisher 112 is. Such information is not currently available in existing auctions and, as a result, advertisers 118 are at risk of overpaying such publishers 112 for placement of their advertisements in website content 110 generated by the publishers 112. With such reliability metrics being accessible by the advertisers 118 participating in advertising auctions, however, the advertisers 118 are better able to make an informed bid in such auctions and are more likely to pay a fair price for placement of their advertisements in the website content 110.

The architectures and individual components described herein may include many other logical, programmatic, and physical components, of which those shown in the accompanying figures are merely examples that are related to the discussion herein. Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

CONCLUSION

Although the various examples have been described in language specific to structural features and/or methodological acts, the disclosure is not necessarily limited to the specific features or acts described. Rather, the specific features and acts are disclosed as example forms of implementing the claimed subject matter.

What is claimed is:

1. A method, comprising:
receiving, with a first electronic device and via a network, a first request comprising identification information, wherein the identification information is indicative of:
i) a user device accessing webpage content, ii) an access time of the user device accessing the webpage content, iii) an identity of a publisher of the webpage content, iv) an identification of the webpage content, and v) a location identifier indicative of a geographic location of the user device at the access time of the user device accessing the webpage content;
determining whether the identification information matches an identifier of a plurality of identifiers stored in a memory associated with the first electronic device;
generating reliability data based on the identification information and the identifier of the plurality of identifiers, the reliability data comprising a real-time reliability metric, wherein the real-time reliability metric is indicative of a validity of the identification information;
generating second request data based on the reliability data, wherein the second request data comprises the reliability data and the first request; and
providing the second request data to a second electronic device different from the first electronic device via the network, wherein the real-time reliability metric is accessible by at least one bidder during a real-time auction associated with the webpage content.

2. The method of claim 1, wherein the first electronic device is configured to:
associate the identifier of the plurality of identifiers with the user device accessing the webpage content; and
provide network access to the user device based on the identifier of the plurality of identifiers.

3. The method of claim 1, wherein the first electronic device comprises at least one server computer of a service provider providing internet access to the user device.

4. The method of claim 1, wherein the identification information comprises an identification code associated with the user device, and wherein the identification code is provided to a third electronic device of the publisher of the webpage content while the webpage content is accessed on the user device.

5. The method of claim 1, further including receiving the first request for the real-time reliability metric associated with the publisher of the webpage content from the second electronic device, wherein the first request includes the identification information, and the real-time reliability metric is generated based at least partly on the first request.

6. The method of claim 1, wherein generating the reliability data further comprises determining a cumulative score, indicative of the validity, based on a plurality of previous determinations as to whether additional identification information matched respective identifiers of the plurality of identifiers stored in the memory.

7. The method of claim 1, wherein generating the reliability data further comprises determining a cumulative score, indicative of the validity, based on a plurality of previous determinations as to whether at least one location identifier of a plurality of location identifiers received by the first electronic device are within a location envelope unique to the user device, wherein the at least one location identifier of the plurality of location identifiers is indicative of a geographic location of the user device at a time that the user device accesses the webpage content.

8. The method of claim 1, wherein generating the reliability data further comprises:
comparing the location identifier to a location envelope, unique to the user device, of a plurality of location envelopes stored in the memory, the location envelope defining a travel radius of the user device;
associating a first value with the publisher if the location identifier is within the location envelope;
associating a second value with the publisher less than the first value if the location identifier is outside of the location envelope; and
generating a cumulative score based on the first value or the second value.

9. The method of claim 1, wherein generating the reliability data further comprises:
associating a first value with the publisher if the identification information matches the identifier of the plurality of identifiers;
associating a second value with the publisher less than the first value if the identification information does not match the identifier of the plurality of identifiers; and
generating a cumulative score based on the first value or the second value.

10. A method, comprising:
receiving, with a first electronic device and via a network, first request comprising identification information, wherein the identification information comprises at least one of an identification code that is unique to a user device accessing webpage content, or a location identifier indicative of a geographic location of the user device at an access time of the user device accessing the webpage content;
determining whether the identification information matches an identifier of a plurality of identifiers stored in a memory associated with the first electronic device of a service provider;
generating reliability data based on the identification information and the identifier of the plurality of identifiers, the reliability data comprising a real-time reliability metric, wherein the real-time reliability metric comprises a cumulative score indicative of a validity of the identification information;

generating second request data based on the reliability data, wherein the second request data comprises the reliability data and the first request; and providing the second request data to a second electronic device of an exchange via the network, wherein the real-time reliability metric is accessible by at least one bidder during a real-time auction hosted by the exchange.

11. The method of claim 10, further including:

associating, via the first electronic device, the identifier of the plurality of identifiers with the user device accessing the webpage content; and providing network access to the user device.

12. The method of claim 10, wherein receiving the identification information includes:

receiving a first electronic file from the second electronic device of the exchange via the network, the first electronic file comprising a request for the real-time reliability metric and identifying a publisher; and extracting the at least one of the identification code or the location identifier from the first electronic file.

13. The method of claim 12, wherein generating the reliability data comprises:

generating a second electronic file including the real-time reliability metric; and transferring the second electronic file to the second electronic device of the exchange, via the network, in response to the request.

14. The method of claim 10, wherein generating the reliability data further comprises:

comparing the location identifier to a location envelope, unique to the user device, of a plurality of location envelopes stored in the memory, the location envelope defining a travel radius of the user device;

associating a first value with a publisher if the location identifier is within the location envelope;

associating a second value with the publisher less than the first value if the location identifier is outside of the location envelope; and generating the cumulative score based on the first value or the second value.

15. The method of claim 10, wherein generating the reliability data further comprises associating a first value with a publisher if the identification code matches the identifier of the plurality of identifiers;

associating a second value with the publisher less than the first value if the identification code does not match the identifier of the plurality of identifiers; and generating the cumulative score based on the first value or the second value.

16. A first electronic device, comprising:

a processor; and memory operably connected to the processor and storing instructions that, when executed by the processor, cause the processor to perform operations including:

receiving a first request comprising identification information via a network, wherein the identification information comprises at least one of an identification code that is unique to a user device accessing webpage content, or a location identifier indicative of a geographic location of the user device at an access time of the user device accessing the webpage content;

determining whether the identification information matches an identifier of a plurality of identifiers stored in the memory;

generating a real-time reliability metric based on the identification information and the identifier of the plurality of identifiers, wherein the real-time reliability metric is indicative of a validity of the identification information;

generating second request data based on reliability data, wherein the second request data comprises the reliability data and the first request; and providing the second request data to a second electronic device different from the first electronic device via the network, wherein the real-time reliability metric is accessible by at least one bidder during a real-time auction associated with the webpage content.

17. The first electronic device of claim 16, wherein the real-time reliability metric comprises a combined score indicative of a validity of the identification code and a validity of the location identifier.

18. The first electronic device of claim 16, wherein generating the real-time reliability metric-comprises:

comparing the location identifier to a location envelope, unique to the user device, of a plurality of location envelopes stored in the memory, the location envelope defining a travel radius of the user device;

associating a first value with a publisher if the location identifier is within the location envelope;

associating a second value with the publisher less than the first value if the location identifier is outside of the location envelope; and generating a cumulative score based on the first value or the second value.

19. The first electronic device of claim 16, wherein the operations further include:

associating a first value with a publisher if the identification code matches the identifier of the plurality of identifiers;

associating a second value with the publisher less than the first value if the identification code does not match the identifier of the plurality of identifiers; and generating a cumulative score based on the first value or the second value.

20. The first electronic device of claim 16, wherein generating the reliability data further comprises associating a first value with a publisher if the identification code matches the identifier of the plurality of identifiers;

associating a second value with the publisher less than the first value if the identification code does not match the identifier of the plurality of identifiers; and generating a cumulative score based on the first value or the second value.

* * * * *